United States Patent Office 2,713,883
Patented July 26, 1955

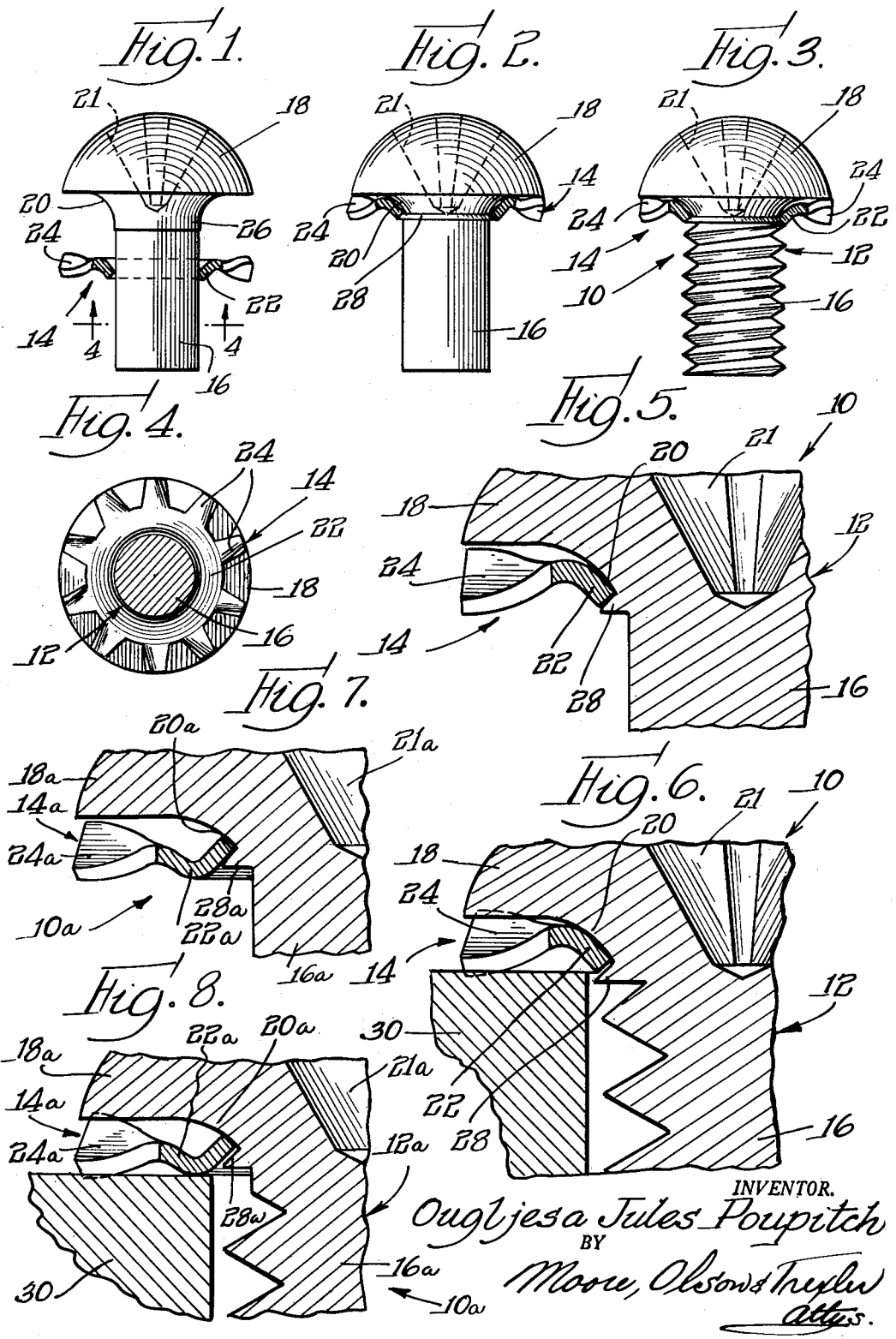

2,713,883

SCREW WITH REINFORCED DRIVER SOCKET AND COUPLED LOCK WASHER

Ougljesa Jules Poupitch, Itasca, Ill., assignor to Illinois Tool Works, Chicago, Ill., a corporation of Illinois Application April 19, 1951, Serial No. 221,769

2 Claims. (Cl. 151—37)

This invention relates generally to fastener units and more particularly to preassembled screws and washers.

It is an object of the present invention to provide an improved preassembled screw and washer in which the screw element is formed so as to increase its resistance to torsional stresses and in which the cooperating portions of the screw and washer are so constructed as to increase the operating efficiency of the washer when placed under clamping stress.

More specifically, the invention contemplates a preassembled screw and washer unit of the type referred to above, wherein the inner margin of the washer member and the complementary section of its companion screw member are formed so as to provide a strut which will counteract the tendency of the washer to be completely flattened under clamping load.

It is proposed to render a screw more resistant to torsional stresses by increasing the diameter of the unthreaded portion of the screw shank adjacent the clamping surface of the screw head and to countersink the inner margin of the washer in conformity with the peripheral area of increased shank diameter.

It is a further object of the present invention to provide a preassembled screw and washer unit, as set forth above, which structurally lends itself for the employment of lock washers having teeth along the outer margin thereof axially deflected in position for locking engagement with the screw head on one side and a companion work surface on the opposite side.

A further object of the present invention is to provide a screw and washer assembly, wherein the screw head is provided with a relatively deep cross slot and the screw shank joins with the clamping side of the screw head so as to provide increased stock thickness in the vicinity of the bottom of said recess.

Other objects and advantages will be more apparent from the following detailed description, when considered in connection with the accompanying drawing, wherein—

Fig. 1 illustrates the first step in telescopically associating a screw blank with a washer in forming a fastener unit which is representative of one embodiment of the present invention;

Fig. 2 shows the washer in operative association with the clamping side of the screw blank and held in this position by an annular bead which is swaged or extruded from an enlarged peripheral portion of the screw blank;

Fig. 3 discloses the combination of the elements of Fig. 2 after the thread has been rolled upon the screw blank;

Fig. 4 is a transverse sectional view taken substantially along the line 4—4 of Fig. 1;

Fig. 5 is an enlarged fragmentary vertical sectional view of the screw blank and washer of Fig. 2 to more clearly illustrate the function of the extruded bead in securing the lock washer in operative association with the clamping side of the screw blank head;

Fig. 6 is a view similar to Fig. 5 after the screw shank has been provided with a thread, the fastener unit being shown in operative association with a work piece;

Fig. 7 is a view similar to Fig. 5, illustrating a washer having a modified countersunk inner margin designed to coact with the fillet at the juncture of the head and shank; and Fig. 8 discloses the device of Fig. 7 after a thread has been rolled on the screw blank and the washer is tightened between the clamping side of the nut head and the complementary surface of a work piece.

Referring now to the drawing more in detail, wherein like numerals are employed to designate similar parts throughout the various views, it will be seen that one embodiment of the invention comprises a preassembled screw and lock washer designated generally by the numeral 10, Figs. 3 and 6. This fastener unit 10 includes a screw element 12 and a lock washer 14. The screw shank 16 adjacent the clamping surface of the screw head 18 is provided with an enlarged surface portion or fillet 20 and a relatively deep cruciform slot 21 for accommodating a complementary screw driver blade. The lock washer 14 includes a countersunk annular body portion 22 conforming in shape with the periphery of the fillet 20, and the outer margin of the lock washer carries a plurality of locking prongs 24.

It will be seen from Fig. 1 that the shank 16, before threads are rolled thereon, is formed with a small area of increased diameter 26 positioned immediately adjacent the fillet 20. The diameter of the area 26 is slightly less than the internal diameter of the lock washer 14 so as to permit the telescopic association of the screw shank and lock washer. The washer is initially positioned with its countersunk body 22 in juxtaposition with respect to the fillet 20, as shown in Fig. 2. A conventional sleeve or forming tool (not shown) may then be forced against the enlarged shank area 26 so as to upset or swage a bead 28. See particularly Fig. 5. This swaged annular bead 28 forms a shoulder or abutment for the inner edge of the countersunk washer body 22, and teeth of the locking prongs 24 are positioned immediately adjacent the clamping surface of the head 18. With the lock washer thus preassembled with the screw blank, the combined elements may be fed to a thread roller so as to form screw threads on the shank 16.

It will be seen that with the lock washer 14 held in operative association with the underside of the clamping surface of the head 18, as described above, the inner frusto-conical periphery of the countersunk washer body 22 lies immediately adjacent the peripheral surface of the fillet 20 and the inner edge of the washer body lies immediately adjacent the annular bead or protuberance 28. Before the fastener unit is applied to a work piece, it is preferable to have the lock washer freely rotatable with respect to the screw head so as to obtain maximum operating efficiency of the washer teeth or prongs. That is to say, as the washer prongs 24 are initially clamped between the clamping surface of the screw head 18 and the complementary surface of a work piece 30, Fig. 6, the twisted disposition of the prongs may permit some slippage of the clamping surface of the screw head along the locking teeth, and the opposite teeth of the prongs may embed themselves within the work surface. As the screw is tightened to its final clamping position, as illustrated in Fig. 6, the oppositely disposed teeth of each prong become embedded within the clamping surface of the screw head on one side and the complementary surface of the work on the opposite side.

From the foregoing it will be apparent that the annular protuberance or bead 28 serves to hold the washer in proper preassembled relation with the screw adjacent the clamping surface of the head thereof in readiness for the subsequent thread rolling operation. As a result, the thread may be rolled to a point immediately beneath the bead. Heretofore screws and lock washers have been preassembled by rolling a thread beneath the telescopically assembled washer and screw blank, thus increasing the diameter of the shank by reason of the thread formation so as to provide means for securing the washer against axial separation from the screw. It is difficult to extrude a thread immediately adjacent the washer, and by employing the present invention the problem of extruding a thread in the immediate vicinity of the washer is greatly facilitated. Also, the preassembly of the screw blank and washer, as illustrated in Figs. 1, 2 and 5, may be carried out with much greater speed than the subsequent thread rolling operation. Hence, by using the bead to hold the washer in place, a stock of preassembled washers and screw blanks may be maintained which are available for subsequent thread rolling when needed.

Particular attention is directed to the cooperation of the conical washer body 22 and the complementary periphery of the fillet 20. The fillet, as previously mentioned, adds strength to the screw at the juncture of the screw head and shank in the vicinity of the bottom of the recess 21, and in addition this fillet coacts with the countersunk washer body as the washer is clamped between the screw head and work piece. Thus, as illustrated in Fig. 6, the coaction between the washer body 22 and the periphery of the fillet 20 is such as to set up considerable resistance to the clamping force. When the washer prongs have been finally secured in their required tightened position, the fillet will firmly bear against the countersunk body 22. This arrangement counteracts the tendency for the washer prongs to be completely flattened, and thus rendered inefficient. It also makes for firm impingement of the screw with the washer body, thereby setting up strong tension and consequent frictional grip between the fillet and the washer body. This increase in frictional contact and the tendency for the conical washer body to yield slightly contributes to the locking efficiency of the washer in that resistance to turning the screw is increased and the tendency for the washer prongs to flatten is materially reduced.

In Figs. 7 and 8 a slightly modified form of fastener unit is disclosed. The fastener unit is designated generally by the numeral 10a, and is similar to the previously described fastener unit 10 except in the shape of the washer body 22a. The washer body 22a is bent in the reverse direction from the washer body 22 with the conical periphery of the washer resting against the bead 28a and the inner edge of the washer against the periphery of the fillet 20a. As the head 18a is tightened against the washer prongs 24a of the lock washer 14a, the inner countersunk margin of the washer body ultimately presents an abutment or strut acting between the surface of the work piece and the fillet 20a. In this position the washer body provides a strut which prevents further collapsing or flattening of the washer teeth, as previously described in connection with the lock washer 14. In both forms the washer body functions to increase frictional resistance between the screw and the washer, and also counteracts to a material extent the tendency for the washer prongs to become flattened.

By having the washer body axially deflected to provide a bearing surface as just described, a stronger washer body is presented than the body of the conventional flat type washer. In other words, without increasing washer diameter, the internal annular washer body may be actually increased in radial width as compared to a flat washer of the same external diameter. Also, the coaction between the inclined or axially deflected washer body and the complementary fillet beneath the screw head is such as to insure absolute concentricity between the washer and screw at all times. It will also be apparent that the washer retaining bead 28 may be circumferentially continuous as disclosed in the drawing or circumferentially spaced along the screw periphery. If spaced protuberances are to be provided it is only necessary to form the slightly enlarged portion of the shank beneath the fillet into a plurality of spaced circumferential sections which in the aggregate define a circle having a diameter slightly greater than the normal diameter of the unthreaded shank. The bead or shoulder 28, when formed, may be positioned above or below the plane defined by the lowermost teeth of the washer prongs, depending upon the environment in which the fastener unit is to be employed.

From the foregoing it will be apparent that the present invention contemplates an improved fastener unit consisting of a preassembled nut and washer. The screw element because of the presence of the fillet at the point of juncture of the screw shank and head is strengthened considerably against torsional stresses tending to shear off the head. In addition, this fillet cooperates with the conical inner margin of the washer body to increase locking efficiency of the washer, first by providing increased frictional resistance due to the contacting of the periphery of the fillet with the washer body, and also by counteracting complete flattening of the washer teeth. The invention also contributes to the ease with which threads may be rolled on the screw shank after assembly of the washer with the screw blank. In many instances screws are made with an unthreaded shank portion immediately beneath the screw head. The present invention makes it possible to preassemble washers beneath the heads of screws of this type. The thread on the screw in such instances may be rolled either prior to or after telescopic association of the washer with the screw member. While for purposes of illustration certain structural embodiments in the form of the lock washer and screw have been shown, it will be apparent that other modifications and changes may be made without departing from the spirit and scope of the appended claims.

The invention is hereby claimed as follows:

1. A fastener unit including a screw element comprising a shank, a head having a clamping surface extending normally to the shank axis, said head having a recess for accommodating a driving tool such as a screw driver and said recess extending into the head at least to a point approximating the plane of said clamping surface, the juncture of the shank and head being defined by a fillet having the outer margin thereof merging into the clamping surface at a point radially outwardly of the major screw diameter and having the intermediate surface thereof curving gradually inwardly and toward the entering extremity of the shank, the material of said fillet contributing substantially to strengthen the otherwise weakened cross section between the bottom of the recess and the juncture of the shank with the head, a lock washer with teeth projecting from opposite faces thereof and having an inner countersunk annular body portion providing a bearing surface in shaped conformity with and positioned adjacent the periphery of said fillet to resist flattening of the teeth when the fastener unit is screwed into a complementary workpiece, annularly disposed abutment means in the vicinity of the juncture of the inner margin of the fillet and shank, said abutment means projecting radially outwardly beyond the adjacent surface of the fillet and the inner margin of the washer to trap the washer on the screw element, said shank having screw threads extending substantially to the fillet, the underside of said annularly disposed abutment means bounded by a recess which lies substantially entirely outwardly of the area defined by an extension of the curve of the fillet to the minor diameter of the thread adjacent said fillet.

2. A fastener unit as set forth in claim 1, wherein the abutments is formed from an enlargement of the shank adjacent the fillet.

(References on following page)

References Cited in the file of this patent

UNITED STATES PATENTS

| | | |
|---|---|---|
| 1,726,972 | Zinnbauer | Sept. 3, 1929 |
| 1,909,147 | Flynn | May 16, 1933 |
| 2,227,464 | Olson | Jan. 7, 1941 |
| 2,270,748 | Baker | Jan. 20, 1942 |
| 2,391,308 | Hanneman | Dec. 18, 1945 |
| 2,537,575 | Crowther | Jan. 9, 1951 |
| 2,557,288 | Hosking | June 19, 1951 |
| 2,588,404 | Muenchinger | Mar. 11, 1952 |

FOREIGN PATENTS

| | | |
|---|---|---|
| 721,806 | France | Mar. 8, 1932 |